Dec. 30, 1958  H. G. THOMPSON  2,866,488
CONTAINER
Filed March 7, 1956
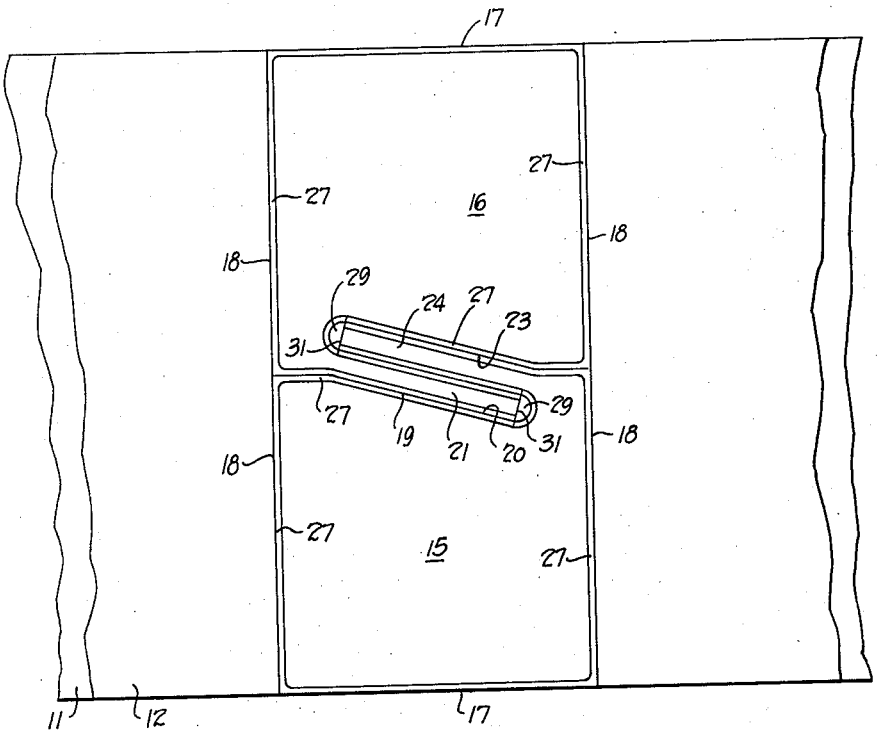
Fig. 1
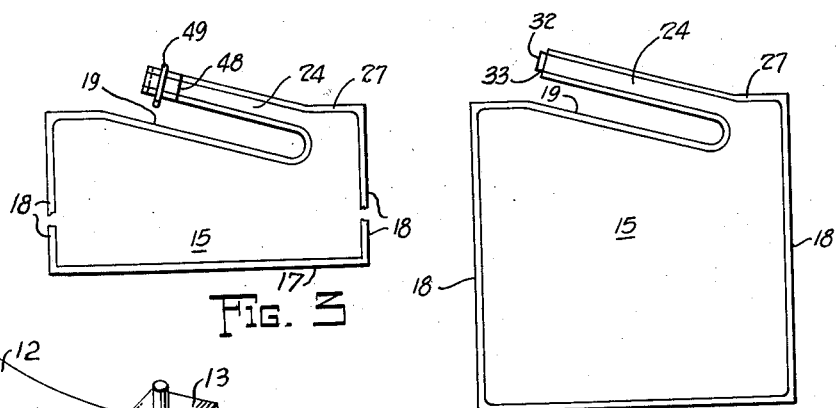
Fig. 3
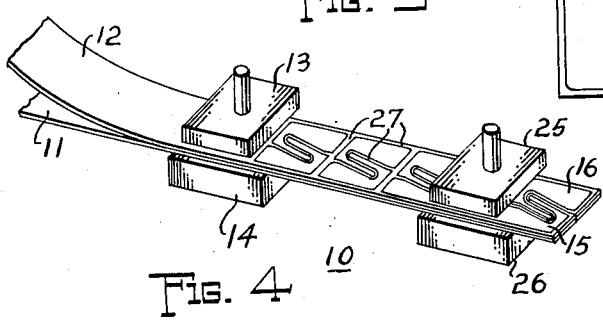
Fig. 4
Fig. 2
INVENTOR.
Harvey G. Thompson
BY Schemm and Knowles
ATTORNEYS

United States Patent Office 2,866,488
Patented Dec. 30, 1958

2,866,488

CONTAINER

Harvey G. Thompson, Shaker Heights, Ohio

Application March 7, 1956, Serial No. 570,061

5 Claims. (Cl. 150—.5)

This invention relates to prepackaging and concerns particularly the provision of prepackaged containers for liquids with attached pouring spouts to avoid spillage when transferring the liquid at the point of use.

An object of the invention is to provide a flexible non-fragile sealed liquid container which is sufficiently inexpensive to be thrown away when used, which may be manufactured and filled economically and without any wastage of material or formation of scrap.

Still another object of the invention is to provide an emergency supply of fuel, such as gasoline for an automobile or other vehicle, to avoid the necessity for trips by service trucks, or the carrying of cans or other containers, subject to spillage, from a filling station to the stalled vehicle.

Other and further objects, features and advantages of the invention will become apparent as the description proceeds.

In carrying out the invention in accordance with a preferred form thereof, liquid-tight bags of thermoplastic sheet material with integral pouring spouts are utilized and are so designed that they may be simply and economically made, filled, stocked, or sold, with the material from one bag interleaving that of the other so that no scrap is formed.

In forming the bags two sheets of thermoplastic material in strip form are passed together through a heat sealing machine which seals the two sheets of thermoplastic material together along lines which are to form the edges of the thermoplastic bags. The arrangement is such that two bags are formed of successive crosswise bands of sheet material, each such bag having a re-entrant portion corresponding to a spout portion of the adjacent bag in the pair so that the sealed bag margins may be cut around heat sealed lines or areas and no scrap is left. After the bags have been formed the tips of the spouts are cut off to leave an opening for filling, and the tip is then sealed for closure during storage or shipment of the bag. Preferably, in the storage of inflammable or fuel liquid the bags are placed inside metal foil-wrapped packages for added protection, or the bags may be formed of plastic to which metallic foil has previously been laminated.

A better understanding of the invention will be afforded by the following detailed description considered in conjunction with the accompanying drawing in which, Fig. 1 is a diagram illustrating the outline of the plastic bags and explaining the method of formation from the dual layers of thermoplastic strip material;

Fig. 2 is a schematic diagram of one of the completed liquid-containing bags illustrating the closure or seal;

Fig. 3 is a diagram of the bag illustrating a manner of closing the spout after it has been filled; and Fig. 4 is a perspective view illustrating a process of sealing the bag edges and cutting out the material to form separate flexible bags.

Like reference characters will be utilized throughout the drawings to designate like parts.

To form emergency gasoline bags, two layers of sheet material 11 and 12 in strip form are passed through a sealing and cutting machine 10 together. The sheet material 11 and 12 may be of any suitable thermoplastic material which is not attacked by gasoline or other fuel, or by lubricating oil; for example, a polyethylene or polyvinyl acetate or a co-polymer of vinyl acetate and polyvinyl chloride. Heat sealing dies 13 and 14 are provided having heating ridges, not shown, with a configuration to seal the material along outlines of bags which are to be formed from the sheets 11 and 12, as shown in Fig. 1.

Preferably, the strips of thermoplastic sheet material 11 and 12 are wide enough for forming pairs of bags 15 and 16 from successive crosswise bands or areas of material across the width of the strips 11 and 12. The bags 15 and 16, as illustrated, have straight edges 17, which will form the bottom edges of finished bags, and straight side edges 18 lying along lines perpendicular to the length of the strips 11 and 12, so that successive pairs of bags are formed without wastage of material. The bags are also formed with angulated edges 19 with a re-entrant portion 20 in a bag 15 forming the spout portion 21 of a bag 16. The bag 16 in turn has a re-entrant portion 23 serving as the spout portion 24 of the bag 15.

Suitable cutting dies 25 and 26 are provided for cutting the bags 15 and 16 apart from each other and from the adjacent bags formed of the thermoplastic strips 11 and 12. It will be understood that the heating ridges of the sealing dies 13 and 14 are of sufficient width to form sealing lines or areas 27 of adequate width so that the material 11 and 12 of the bags may be cut through substantially the central portions of the narrow sealed areas 27 without cutting any opening in the bags.

When the bags are cut apart the tip portions 29 of the spouts 21 and 24 are cut off so as to leave openings 31 which are the only openings in the bags 15 and 16. After each bag has been filled with liquid, the end 32 of the pouring spout 24 is sealed or closed. It may be closed by a patch 33 secured to the end 32 of the pouring spout 24, but preferably is folded over and secured by a clip 49 as illustrated in Fig. 3.

Since the pouring spout 24 as well as the bag is flexible, a small-mouthed tank such as a gasoline tank of an automobile may readily be filled without spilling any liquid from the thermo-plastic bag, such as the bag 16.

When the user desires to utilize the contents of one of the liquid containing bags, the seal 33 or 49 is removed and the spout 21 is inserted in the mouth of the receptacle to be filled. In case it is not necessary to utilize all of the liquid within the container 15 or 16, the spout 21 is readily closed again by folding back the end 48 as shown in Fig. 3 and securing the folded over end 48 with the wire or spring metal clip 49 originally used.

Although the prepacked liquid containing bag has been described particularly as an emergency fuel container for automobiles, which may be carried odorlessly in the trunk or elsewhere in the automobile, it will be understood that the invention is not limited thereto and does not exclude the use of such containers for other gasoline engine devices such as lawn mowers, for camp stoves and lamps, or other equipment requiring white or unleaded gasoline, for cleaning fluids such as naphtha or benzene, for kerosene and for gasoline ready-mixed with oil for outboard and other two-cycle engines. Thus a sales promotional device has been provided for liquid-utilizing equipment and for specially prepared and mixed fuel, heating and illuminating oils. Moreover the arrangement avoids aggravating time-consumption to both the customer and the gasoline service station operator involved in filling and carrying emergency cans.

While the invention has been described as embodied in concrete form and as operating in a specific manner in accordance with the provisions of the Patent Statutes, it should be understood that the invention is not limited thereto, since various modifications will suggest themselves to those skilled in the art without departing from the spirit of the invention, the scope of which is set forth in the annexed claims.

What I claim and desire to secure by Letters Patent of the United States is:

1. A plastic container comprising a pair of sheets of fusible material each having three straight edges lying along the sides of a rectangle, and a fourth edge with a narrow reentrant portion providing a narrow projecting spout corresponding in outline shape to the re-entrant edge portion with a tip cut away the long axis of the spout being disposed at an acuate angle to the edge of the container having the re-entrant portion, said sheets lying one upon the other with edges heat-sealed together to form an enclosure for holding a fluid and capable of being filled or emptied through the tip of said spout.

2. A plastic container comprising in combination a pair of sheets of fusible material each having an outline including a narrow re-entrant edge portion providing a narrow projecting spout corresponding in outline shape to the re-entrant edge portion with a tip cut away, the long axis of the spout being disposed at an acute angle to the edge of the container having the re-entrant portion, such sheets lying one upon the other, sealed together along said outline to form an enclosure for holding a fluid, and capable of being filled or emptied through the tip of said spout.

3. A collapsible container comprising two thicknesses of flexible flat sheet plastic material marginally joined together in a continuous seam defining in the flat empty condition of the container a substantially closed figure having a top edge comprising a re-entrant portion having a reverse bend and spaced confronting runs joined together by the reverse bend, one such run extending across the major part of the container top, said top edge also comprising an outer edge run parallel to the one run of the re-entrant portion, said outer run and the other of the confronting runs being the edges of an integral external pouring spout, and the spout being of less length than the distance across the container top, whereby the pouring spouts of an identical pair of the containers can be interfitted in packing and stacking the containers, the spout of one container of such a pair of interfitted containers being received between and having its edge runs adjacent and parallel to the confronting edge runs of the other container of the pair and the spout of such other container being similarly received between and having its edge runs adjacent and parallel to the confronting edge runs of such one of the interfitted containers.

4. A collapsible container comprising two thicknesses of flexible flat sheet plastic material marginally joined together in a continuous seam defining in the flat empty condition of the container a substantially closed figure having a straight bottom edge, spaced side edges angularly disposed relative to the bottom edge, and a top edge spaced from the bottom edge and extending between the side edges, the top edge comprising a re-entrant portion having a reverse bend and spaced confronting runs joined together by the reverse bend, one such run extending across the major part of the container top, said top edge also comprising an outer edge run parallel to the one run of the re-entrant portion, said outer run and the other of the confronting runs being the edges of an integral external pouring spout, and the spout having its longitudinal axis disposed at an acute angle to the bottom edge and intersecting the line extension of such bottom edge outside the closed figure, whereby the pouring spouts of an identical pair of the containers can be interfitted in packing and stacking the containers, the spout of one container of such a pair of interfitted containers being received between and having its edge runs adjacent and parallel to the confronting edge runs of the other container of the pair and the spout of such other container being similarly received between and having its edge runs adjacent and parallel to the confronting edge runs of such one of the interfitted containers.

5. A collapsible container comprising two thicknesses of flexible flat sheet plastic material marginally joined together in a continuous seam defining in the flat empty condition of the container a generally rectangular figure having substantially parallel side edges, a bottom edge extending between the side edges and a top edge also extending between the side edges, the top edge comprising a re-entrant portion having a reverse bend and spaced confronting runs joined together by the reverse bend, one such run extending across the major part of the container width, said top edge also comprising an outer edge run parallel to the one run of the re-entrant portion, said outer run and the other of the confronting runs being the edges of an integral external pouring spout, and the pouring spout being of less length than the distance between the side edges whereby the pouring spouts of an identical pair of the containers can be interfitted in packing and stacking the containers, the spout of one container of such a pair of interfitted containers being received between and having its edge runs adjacent and parallel to the confronting edge runs of the other container of the pair and the spout of such other container being similarly received between and having its edge runs adjacent and parallel to the confronting edge runs of such one of the interfitted containers.

References Cited in the file of this patent

UNITED STATES PATENTS

| | | |
|---|---|---|
| 636,317 | Von Buhler | Nov. 7, 1899 |
| 1,341,157 | Sublett | May 25, 1920 |
| 1,747,596 | Peal | Feb. 18, 1930 |
| 2,426,384 | Blanchard | Aug. 26, 1947 |
| 2,645,591 | Makrauer | July 14, 1953 |
| 2,682,902 | Metzger | July 6, 1954 |
| 2,688,995 | Wagoner | Sept. 14, 1954 |
| 2,724,418 | Krupp | Nov. 22, 1955 |

UNITED STATES PATENT OFFICE
CERTIFICATE OF CORRECTION

Patent No. 2,866,488                December 30, 1958

Harvey G. Thompson

It is hereby certified that error appears in the printed specification of the above numbered patent requiring correction and that the said Letters Patent should read as corrected below.

Column 3, line 15, claim 1, for "an acuate angle" read -- an acute angle --.

Signed and sealed this 1st day of March 1960.

(SEAL)
Attest:

KARL H. AXLINE
Attesting Officer

ROBERT C. WATSON
Commissioner of Patents